(12) United States Patent
Oka et al.

(10) Patent No.: US 7,555,197 B2
(45) Date of Patent: Jun. 30, 2009

(54) IMAGE PROCESSING APPARATUS

(75) Inventors: Hiroto Oka, Tokyo (JP); Makoto Gohda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 10/951,632

(22) Filed: Sep. 29, 2004

(65) Prior Publication Data
US 2005/0111834 A1 May 26, 2005

(30) Foreign Application Priority Data
Oct. 28, 2003 (JP) ............... 2003-367472

(51) Int. Cl.
*G11B 27/00* (2006.01)
(52) U.S. Cl. ............... 386/54; 386/48; 386/52; 386/55; 386/75
(58) Field of Classification Search .......... 386/54
See application file for complete search history.

(56) References Cited

U.S. PATENT DOCUMENTS 6,628,889 B2  9/2003  Inoue ............... 386/52
6,683,649 B1 *  1/2004  Anderson ............... 348/333.05
2002/0154226 A1  10/2002  Gohda
2003/0016947 A1  1/2003  Ishii

FOREIGN PATENT DOCUMENTS

| JP | 2003-32619 | 1/2003 |
|---|---|---|
| WO | WO 98/06098 | 2/1998 |
| WO | WO 98/26421 | 6/1998 |

* cited by examiner

*Primary Examiner*—Marsha D Banks Harold
*Assistant Examiner*—Daniel Tekle
(74) *Attorney, Agent, or Firm*—Fitzpatrick, Cella, Harper & Scinto

(57) ABSTRACT

An image processing apparatus includes: a display control unit for displaying a story board on a display device, the story board displaying a plurality of representative images corresponding to a plurality of image clips in a reproduction order and displaying an audio lane showing a plurality of audio clips in a reproduction order in parallel to the plurality of representative images; and a change unit for changing a reproduction order of the plurality of image clips and audio clips by using the story board displayed on the display device, wherein the display control unit displays a border of the audio clip on the audio lane at one of a first predetermined position and a second predetermined position corresponding respectively to a left end and a right end of each of the plurality of representative images.

8 Claims, 9 Drawing Sheets

IMAGE PROCESSING APPARATUS

BACKGROUND OF THE INVENTION

1. Field of the Invention

The present invention relates to an image processing apparatus, and more particularly to a data editing process of image data and audio data.

2. Related Background Art

Nowadays, general users have many opportunities to deal with digital images such as digital still images and digital moving images which are increasing nowadays because digital cameras, digital video cameras and camera-mounted portable phones are prevailing. It is expected that these apparatuses can take moving images for a long time with a high image quality, because of technical advancement such as an increase in the number of photographing pixels and an increase in the capacity of a recording medium.

Demand is becoming high for video editing of raw materials such as digital images and audio data using a personal computer (PC) or the like, and video editing software of variety types running on PC is actually available.

Some of such video editing software provides a video editing method utilizing time lines, as a user interface for those users skilled in video editing. As shown in FIG. 2, in the time line, image data and audio data are disposed along the time axis for each track (although one track is displayed for each of the image data and audio data in FIG. 2, some types display a plurality of tracks).

Video editing using the time lines can edit very minutely and is suitable for those users requesting for a sophisticated editing function. However, there is the disadvantage that novices of video editing are difficult to understand the operation.

There is another software which provides a video editing method using a story board, for novices or for rough editing before the editing work using time lines. As shown in FIG. 3, in the story board, representative images of respective image clips are disposed time-sequentially. With this method, video editing can be done by selecting thumbnails of images and rearranging them, so that even novices can understand easily. The editing process using such a story board is disclosed in Japanese Patent Application Laid-open No. 2003-32619 (a corresponding US application was made public. The publication number is 2003-016947).

Although the reproduction order of each image clip can be recognized easily on the editing screen of the story board type, there is the problem that it is impossible to know how audio data is superposed on each image clip.

SUMMARY OF THE INVENTION

The objective of present invention is to solve these problems.

Another object of the present invention to make audio data corresponding to each image clip be easily recognizable even with the editing method of the story board type.

In order to achieve these objects, an image processing apparatus of the present invention comprises: display control means for displaying a story board on a display device, the story board displaying a plurality of representative images corresponding to a plurality of image clips in a reproduction order and displaying an audio lane showing a plurality of audio clips in a reproduction order in parallel to the plurality of representative images, and the display control means displaying a border of the audio clip on the audio lane at one of a first predetermined position and a second predetermined position corresponding respectively to a left end and a right end of each of the plurality of representative images; and change means for changing a reproduction order of the plurality of image clips and audio clips by using the story board displayed on the display device. The other objects and features of the present invention will become apparent from the description of the embodiments of the present invention when read in conjunction with the following drawings.

DETAILED DESCRIPTION OF THE PREFERRED EMBODIMENTS

Figure 1:
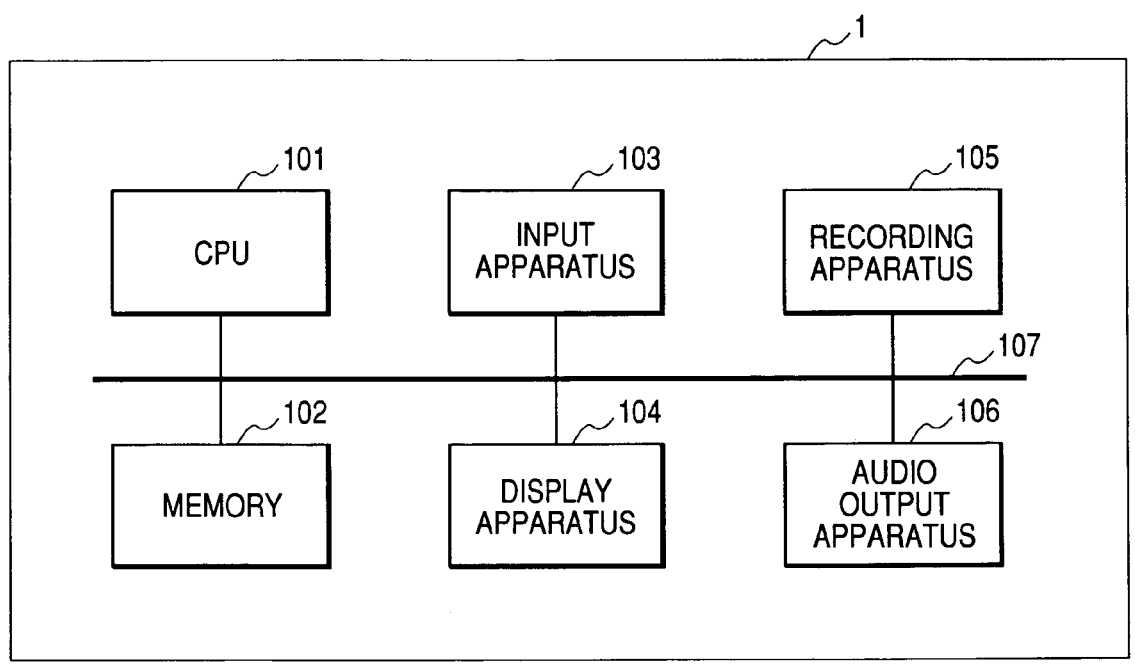
FIG. 1 is a block diagram of an editing apparatus for image data and audio data according to the present invention.
Figure 2:
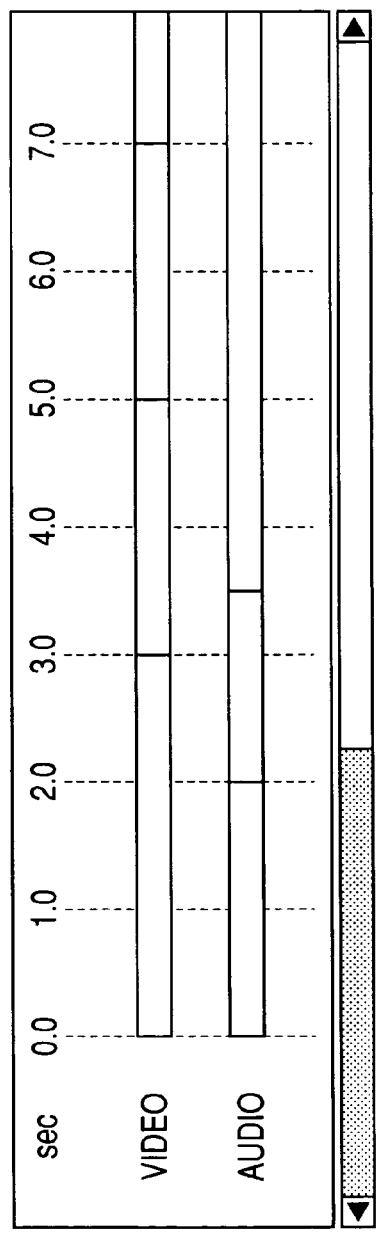
FIG. 2 shows a display example of time lines.
Figure 3:
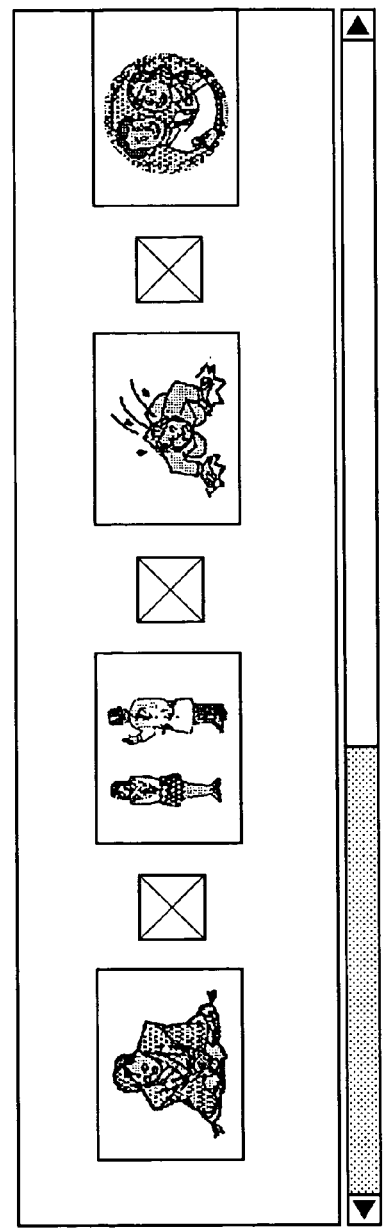
FIG. 3 shows a display example of a story board.

FIG. 1 is a block diagram showing an editing apparatus for image data and audio data according to the present invention. The editing apparatus is constituted of a central processing unit (CPU) 101, a memory 102, an input apparatus 103 such as a mouse and a keyboard, a display apparatus 104 such as a monitor, a recording apparatus 105 such as a hard disk drive, an audio output apparatus 106 such as a speaker, and a bus 107 for data transfer among these components. Although omitted in FIG. 1, the editing apparatus may be provided with an external recording apparatus interface for data transfer to and from an external recording apparatus such as a CD-ROM, a DVD-ROM and a memory card, a digital camera and a digital video camera, and a network interface for data transfer to and from a network.

As will be described later, CPU 101 reproduces image clips and audio clips recorded in the recording apparatus 105 in accordance with the editing results formed by a user which operated the input apparatus 103 with viewing the screen displayed on the display apparatus 104. In accordance with a program stored in the memory 102 or recording apparatus 104, CPU 1 also executes a process of generating a display function of an editing screen of the story board type to be described hereinbelow and generating reproduction program data as the editing results, and other processes. The function of the editing apparatus shown in FIG. 1 can be realized by a PC using editing software.

Figure 4:
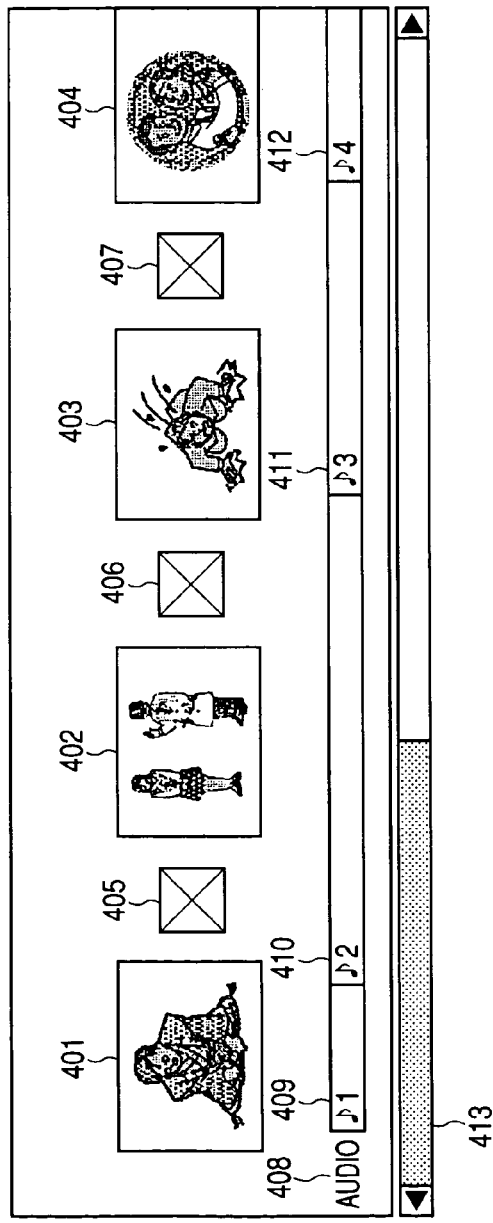
FIG. 4 shows a display example of a story board according to an embodiment.

FIG. 4 is a diagram showing an example of a story board to be displayed on the display apparatus 104 by the editing apparatus 1.

Reference numerals 401 to 404 denote representative images of respective image clips. For the still image clip, the still image is displayed, and for the moving image clip, the first frame image is displayed. In FIG. 4, the clip displayed on the left side of the screen is reproduced first. Reference numerals 405 to 407 denote transition boxes representative of transition effects. Each transition box indicates an effect to be added when the forward and backward image clips (in FIG. 4, clips corresponding to the left and right representative images) are switched. Reference numeral 408 denotes an audio lane for displaying audio data. Reference numerals 409 to 412 denote audio clips corresponding to one or a plurality of audio data sets. The audio lane 408 and audio clip will be later described in detail. Reference numeral 413 denotes a scroll bar for scrolling the story board right and left.

Although not shown in FIG. 4, each image clip has a different reproduction time. For example, the reproduction time is the time taken to reproduce the whole length of a moving image (may be trimmed) and the time taken to continue reproducing the still image.

As shown in FIG. 4, in this embodiment, the representative images of the image clips and the audio lane showing the audio clips are displayed in a juxtaposed manner on the story board. Therefore, the reproduction timings of each image clip and each audio clip can be recognized easily.

Brief description will be made on a process of changing the reproduction order of image clips by using the story board screen.

For example, in case that the image clip to be reproduced second is to be changed to another clip, a user operates a mouse or the like to select the image clip 402 and thereafter, the user instructs a clip insert command by designating an icon, menu bar or the like (not shown). As the clip insert command is instructed, CPU 101 displays a list of representative images of the moving image clips recorded in the recording apparatus 105, and the user selects and determines the representative image of the clip to be inserted, from the displayed representative images. Therefore, the representative image 402 displayed until this time at 402 is replaced with the newly selected representative image of the image clip at 402, and the reproduction order of the following representative images is changed to shift the representative images to the right by one.

Namely, the image at 402 displayed as the second clip is displayed at 403, and the image at 403 is displayed at 404.

In case that the image clip is to be deleted, the representative image of the clip to be deleted, for example, the image 402, is selected and thereafter a delete command is instructed. CPU 101 deletes the image displayed at 402, the representative images of the clips reproduced third and later are displayed by shifting the representative images to the left by one. Namely, the image displayed at 403 is displayed at 402, and the image displayed at 404 is displayed at 403.

Next, description will be made on the display procedure of the audio clips on the audio lane 408.

Figure 5:
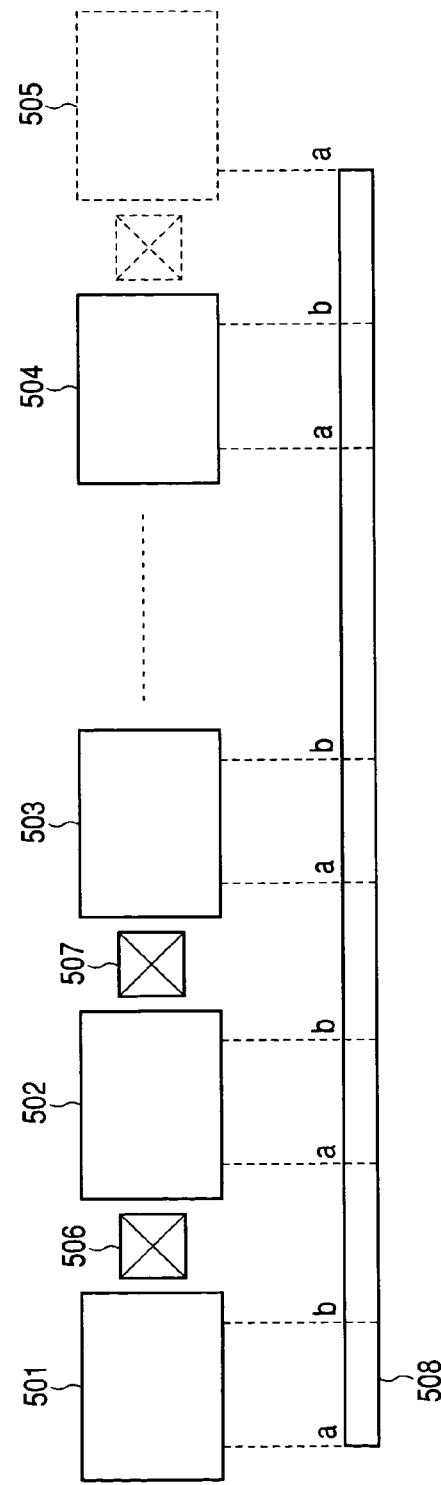
FIG. 5 is a diagram showing a display example of an audio lane.

As described above, since each image clip displayed on the story board has a different reproduction time, the audio lane is expressed as shown in FIG. 5. Reference numerals 501 to 504 denote representative images representative of respective image clips. Reference numeral 501 denotes the representative image of the leading image clip, and reference numeral 504 denotes the representative image of the last image clip. Reference numeral 505 denotes a virtual clip not displayed actually. Reference numerals 506 and 507 denote transition boxes. The audio lane 508 has discrete delimiters indicated by a and b in FIG. 5. In this embodiment, the delimiter a is called the left delimiter of the image clip, and the delimiter b is called the right delimiter of the image clip. The border positions a and b are set to predetermined positions in the display range of the representative image of each image clip. In this embodiment, as the border position of the audio clip, one of the left delimiter a and right delimiter b is used.

First, description will be made on the method of displaying the leading audio clip.

In case that the total reproduction time of the leading audio data to the n-th audio data (n>0) is shorter than the reproduction time of the leading image clip, the leading audio data to the n-th audio data are displayed as one audio clip in a section from the left end of the audio lane to the right delimiter b of the leading image clip.

In case that the leading audio data ends at the intermediate point of the m-th image clip (m>1), the audio clip corresponding to the leading audio data is displayed in a section from the left end of the audio lane to the left delimiter a of the m-th image clip.

In case that the reproduction time of the leading audio data is longer than the total reproduction time of all image clips, the audio clip corresponding to the leading audio data is displayed in a section from the left end of the audio lane to the left delimiter a of the virtual clip next to the last image clip.

Next, description will be made on the case wherein the audio clip representative of the (n−1)-th (n>1) audio data ends at the left delimiter a of the n-th image clip.

First, if the (n+k)-th (k≧0) audio data ends at the intermediate point of the m-th image clip and the (n+k+1)-th audio data ends at the intermediate point of the (m+l)-th (l>1) image clip, the audio clips corresponding to the n-th to (n+k)-th audio data are displayed in a section from the left delimiter a to the right delimiter b of the m-th image clip.

If the n-th audio data ends at the intermediate point of the (m+l)-th image clip, the audio clip corresponding to the n-th audio data is displayed in a section from the left delimiter a of the m-th image clip to the left delimiter a of the (m+1)-th image clip.

If the n-th audio data is longer than the sum of a remaining reproduction time of the m-th image clip and a reproduction time of all image clips following after the m-th image clip, the audio clips corresponding to the n-th audio data to the last audio data are displayed in a section from the left delimiter a of the m-th image clip to the left delimiter a of the virtual clip next to the last image clip.

Next, description will be made on the case wherein the audio clip representative of the (n−1)-th (n>1) audio data ends at the right delimiter b of the m-th (m>0) image clip.

If the n-th audio data ends at the intermediate point of the (m+l)-th (l>0) image clip, the audio clip corresponding to the n-th audio data is displayed in a section from the right delimiter b of the m-th image clip to the left delimiter a of the (m+1)-th image clip.

If the n-th audio data is longer than the sum of a remaining reproduction time of the m-th image clip and a reproduction time of all image clips after the m-th image clip, the audio clips corresponding to the n-th audio data to the last audio data are displayed in a section from the right delimiter b of the m-th image clip to the left delimiter a of the virtual clip next to the last image clip.

If an audio clip corresponds to a plurality of audio data sets and when this audio clip on the display screen is selected, a list of audio data sets contained in the audio clip is displayed. By operating the input apparatus 103 such as a mouse, a user can select one or a plurality of audio data sets from the list. The audio data set is, for example, a collection of audio data such as one music program.

Next, description will be made on specific display examples of the story board described above, with reference to the drawings.

Figure 6:
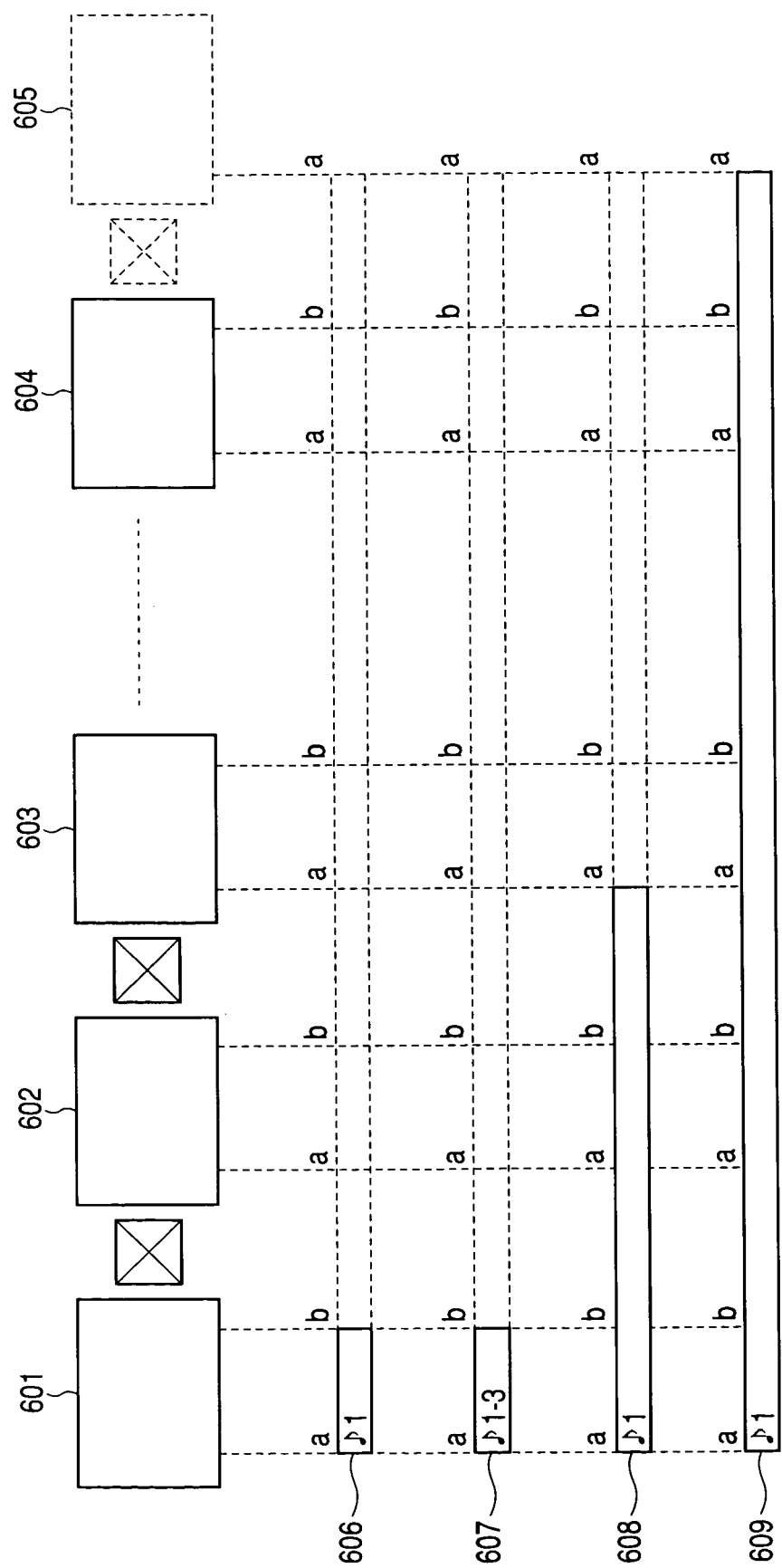
FIG. 6 is a diagram showing a display example of audio lanes of a first music program.

FIG. 6 is a diagram showing a display example of a first music program.

Reference numerals 601 to 604 denote representative images of first, second, third and last image clips, and reference numeral 605 denotes a virtual clip. Reference numeral 606 denotes an audio lane wherein a reproduction time of the audio clip of the first music program is shorter than a reproduction time of the image clip of the representative image 601. Reference numeral 607 denotes an audio lane wherein a reproduction time of the audio clips of the first to third music programs is shorter than a reproduction time of the image clip of the representative image 601. Reference numeral 608 denotes an audio lane wherein the audio clip of the first music program ends at the intermediate point of the image clip of the representative image 603. Reference numeral 609 denotes an audio lane wherein the audio clip of the first music program is longer than a total reproduction time of all the image clips.

In this manner, the border position of the leading audio clip on the audio lane is the right delimiter b only when the audio clip or clips terminate within the reproduction time of the leading image clip, and the left delimiter a in other cases.

Figure 7:
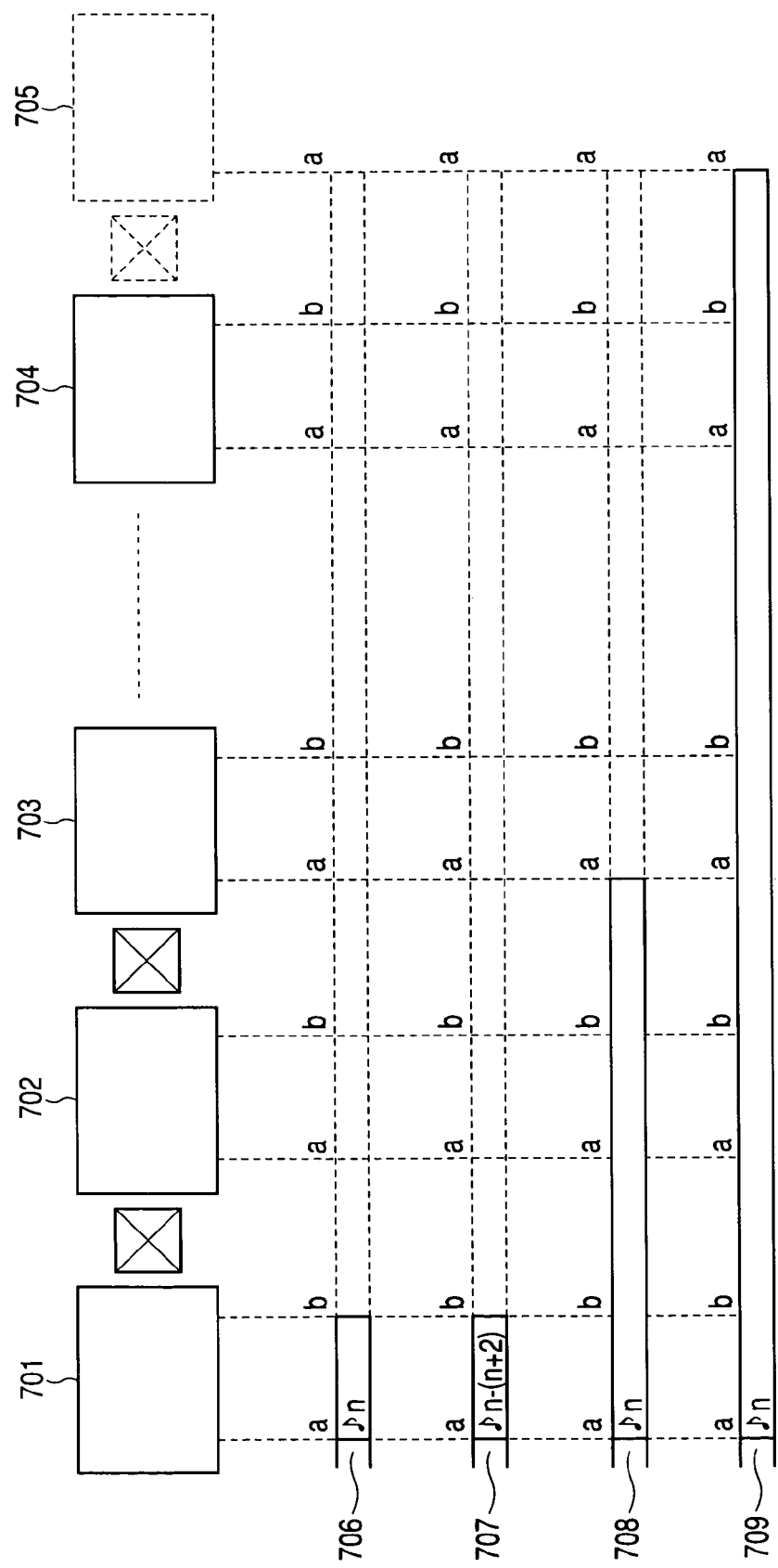
FIG. 7 is a diagram showing a display example of audio clips of an n-th (n>1) music program when an audio clip representative of an (n−1)-th music program ends at a left delimiter.

FIG. 7 is a diagram showing a display example of the n-th audio clip when the (n−1)-th (n>1) starts reproducing before the reproduction period of the (m−1)-th (m>1) image clip and ends during the reproduction period of the m-th image clip. In this case, the border position of the (n−1)-th audio clip is the left delimiter of the m-th image clip.

Reference numerals 701 to 704 denote representative images of m-th, (m+1)-th, (m+2)-th and last image clips; and reference numeral 705 denotes a virtual clip. Reference numeral 706 denotes an audio lane wherein the n-th audio clip ends within the reproduction period of the image clip 701. Reference numeral 707 denotes an audio lane wherein the audio clips of the n-th to (n+2)-th music programs terminate within the reproduction period of the image clip 701. Reference numeral 708 denotes an audio lane wherein the n-th audio clip ends within the reproduction period of the image clip 703. Reference numeral 709 denotes an audio lane wherein the audio clip of the n-th music program is longer than the sum of a remaining reproduction time of the image clip 701 and a reproduction time of all the image clips following after the image clip 701.

In this manner, according to this embodiment, the border position of the back end of the audio clip on the audio lane is displayed as the right delimiter b only when the start and end points of the audio clip are positioned within the reproduction period of the corresponding image clip (in this example, 701), and the border position of the back end is displayed as the left delimiter a of the representative image of the image clip having the reproduction end point when one audio clip is reproduced over a plurality of image clips.

If the reproduction time of one audio clip is longer than the total reproduction time of all moving image clips, the border position of the back end is displayed as the left delimiter a of the virtual clip 705 next to the last clip.

Figure 8:
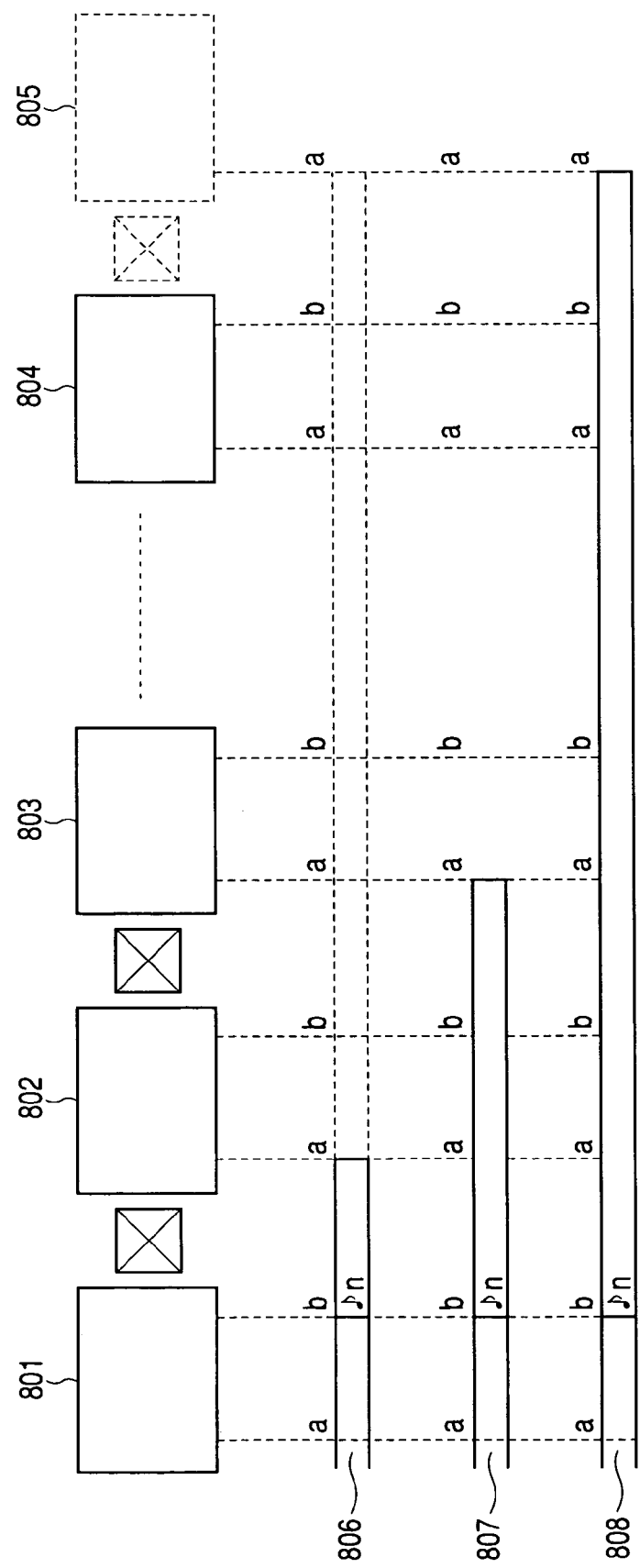
FIG. 8 is a diagram showing a display example of audio clips of an n-th (n>1) music program when an audio clip representative of an (n−1)-th music program ends at a right delimiter.

FIG. 8 is a diagram showing a display example of the n-th (n>1) audio clip when the border position of the back end of an audio clip representative of the (n−1)-th music program is displayed at the right delimiter b of the m-th (m>1) image clip.

Reference numerals 801 to 804 denote representative images of m-th, (m+1)-th, (m+2)-th and last image clips, and reference numeral 805 denotes a virtual clip. Reference numeral 806 denotes an audio lane wherein the audio clip of the n-th music program ends at the intermediate point of the image clip 802. Reference numeral 807 denotes an audio lane wherein the audio clip of the n-th music program ends at the intermediate point of the image clip 803. Reference numeral 808 denotes an audio lane wherein the audio clip of the n-th music program is longer than the sum of a remaining reproduction time of the image clip 801 and a reproduction time of all the image clips following after the image clip 801.

In this case, since the audio clip does not have (in this case, 707) both the reproduction start and end points during the reproduction of one image clip (in this case, 801), the audio clip always exists over a plurality of image clips, and the position of the left delimiter a of the image clip having the end point is displayed as the border position of the back end of the audio clip.

If the reproduction time of the audio clip is longer than the total production time of all moving image clips to follow, the left delimiter a of the virtual clip 805 next to the last image clip is displayed as the border position of the back end.

Figure 9:
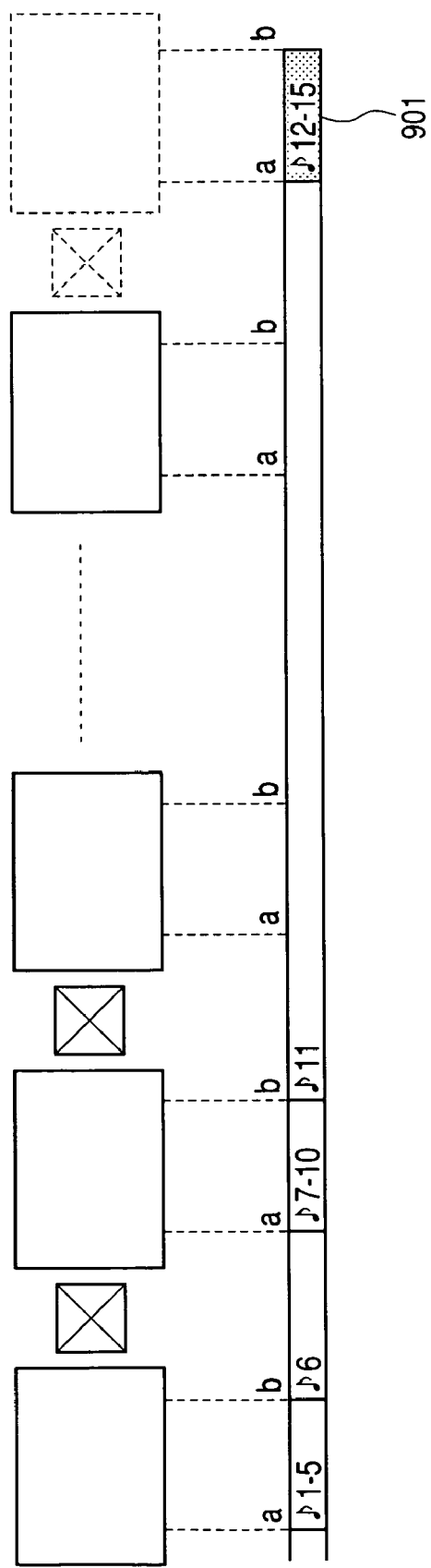
FIG. 9 is a diagram showing a display example of audio clips of an (n+1)-th music program when an audio clip representative of an n-th music program ends at a left delimiter of a virtual clip.

FIG. 9 is a diagram showing a display example of an audio clip of the (n+1)-th (n>1) and following music programs when the border position of the back end of the audio clip representative of the n-th music program is at the left delimiter a of the virtual clip. In this case, as indicated at 901, the audio clips corresponding to the (n+1)-th to last music programs are displayed in a section from the left delimiter a to the right delimiter b of the virtual clip.

Figure 10:
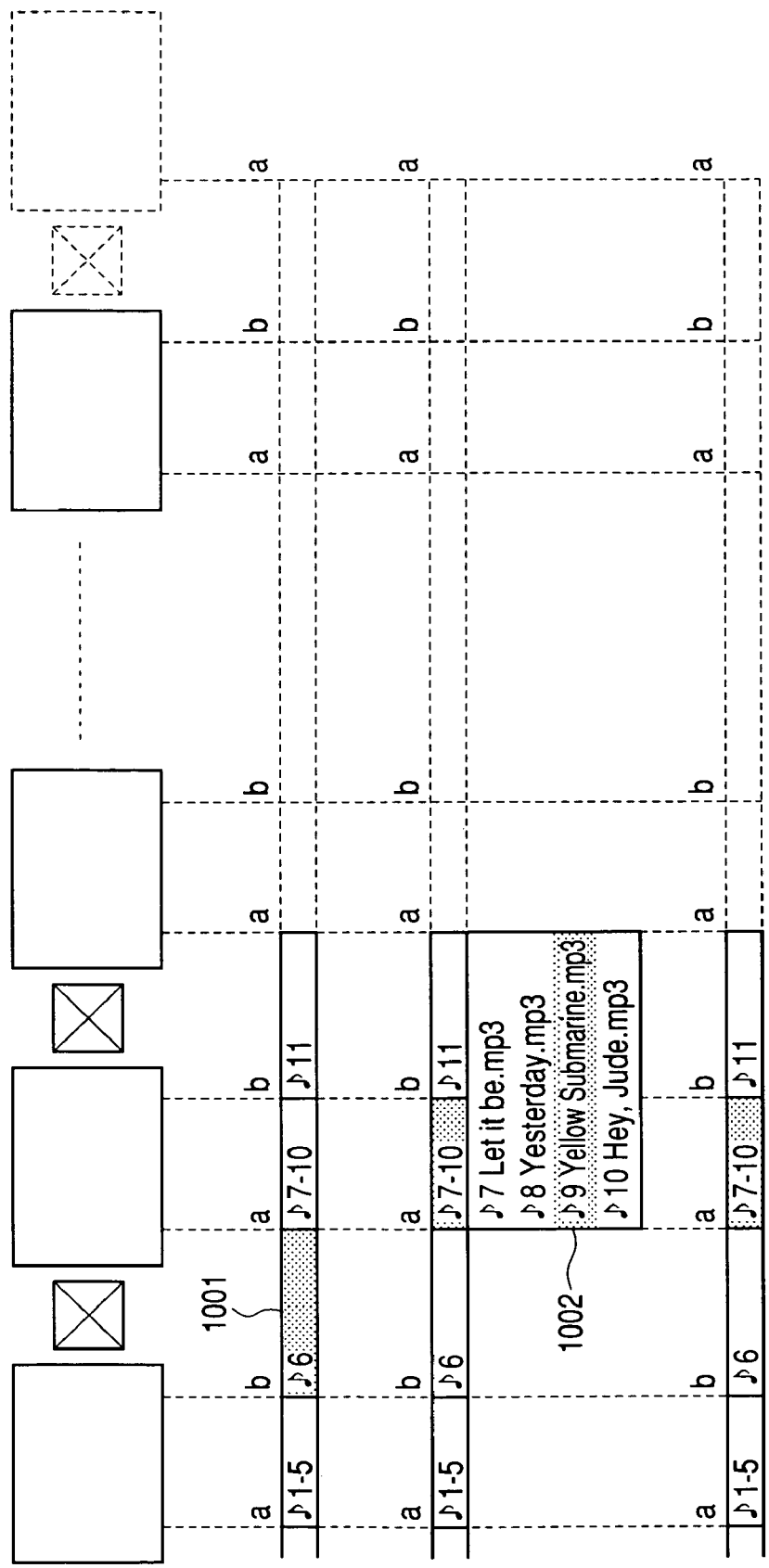
FIG. 10 is a diagram illustrating a method of selecting an audio clip.

FIG. 10 is a diagram showing a display example when an audio clip is selected.

If an audio clip corresponds to one audio data set, a user operates the input apparatus 103 to click the audio clip or to focus and key-depress the audio clip, so that the audio data can be selected (1001).

If an audio clip corresponds to a plurality of audio data sets, the audio clip is clicked or focused and key-depressed so that a list of audio data sets is displayed (1002). The audio data set or sets in the list are clicked or focused to be key-depressed so that one or a plurality of audio data sets can be selected. As a method of selecting a plurality of audio data sets, for example, while a certain key (e.g., a control key or a shift key) is depressed, the audio data sets are sequentially clicked.

Figure 11:
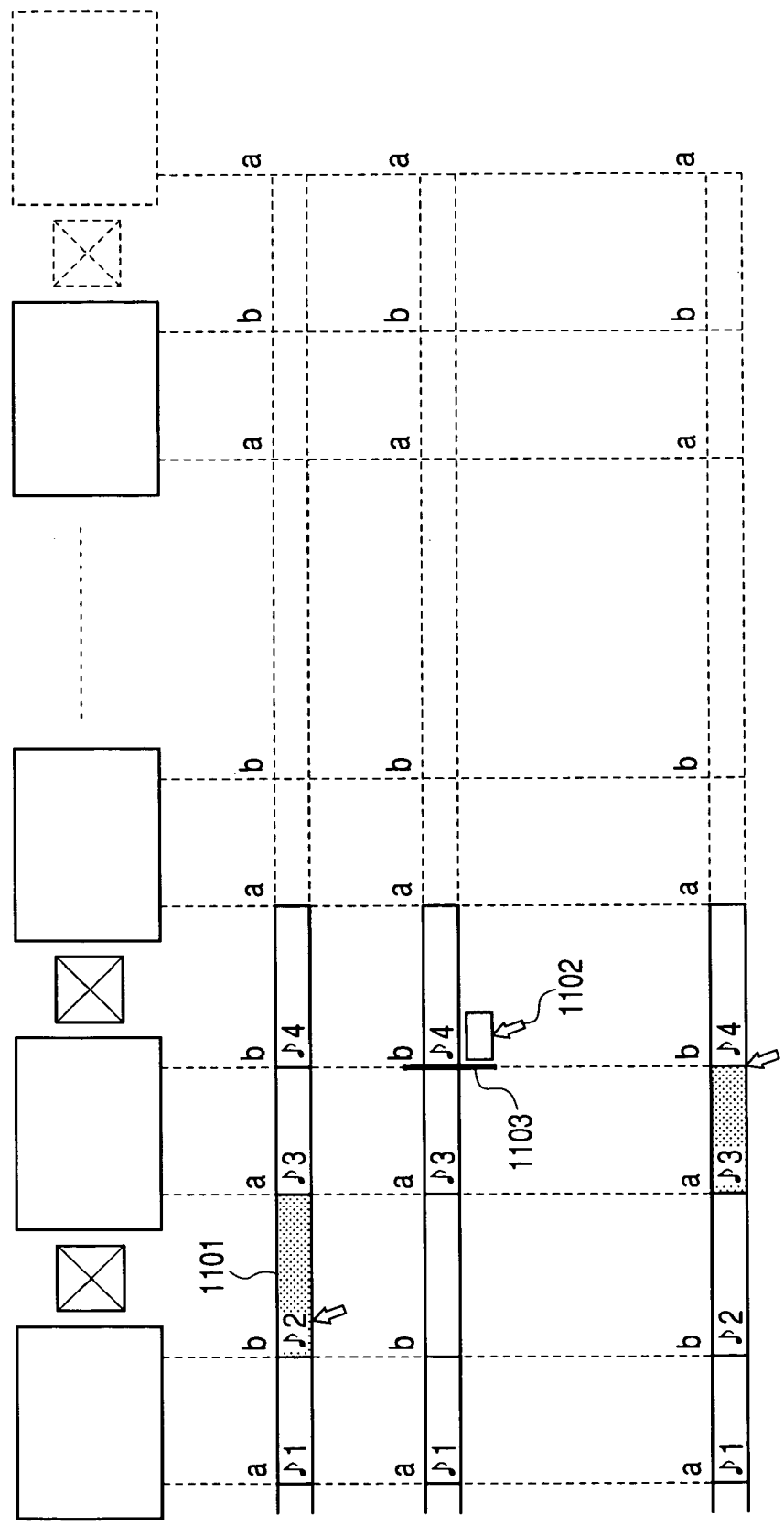
FIG. 11 is a diagram illustrating an example of changing the order of audio data through drag-and-drop.

FIG. 11 is a diagram showing a display example when the order of audio data sets is altered through drag-and-drop by the input apparatus 103.

First, a mouse cursor is positioned at the audio data 1101, and the mouse cursor is moved to the position at 1102 while dragging the mouse cursor, so that a bar indicated at 1103 is displayed. At this time, as the mouse cursor is dropped, the audio data 1101 is moved to the position at the bar 1103.

Similarly, the audio data in the list at 1002 may be dragged to move it, or conversely, audio data may dragged and dropped on the list at 1002, to thereby move the audio data.

In addition to moving audio data through drag-and-drop by the mouse, for example, audio data may be moved by selecting it with a mouse or key and thereafter by using a key such as a cursor key.

As above, according to this embodiment, on the story board, audio lanes indicating audio clips are displayed in parallel with representative images of image data, and the border position of each audio clip on the audio lane is displayed by changing it in accordance with the reproduction position of each audio clip. Accordingly, a user can easily recognize the reproduction timings of image clips and audio clips on the story board. Video editing using the story board can be performed easily.

The objects of the present invention can also be achieved by supplying a system or an apparatus with a storage medium (or recording medium) storing software program codes realizing the function of each embodiment described above, and making a computer (CPU or MPU) of the system or apparatus read and execute the program codes stored in the storage device.

In this case, the software program codes themselves read from the storage medium realize the embodiment functions. Therefore, the storage medium storing the program codes constitutes the present invention. The invention also covers not only the case wherein the computer executes the read program codes to realize the embodiment functions but also the case wherein an operating system (OS) running on the computer in accordance with instructions of the program codes executes a portion or the whole of the actual processes to realize the embodiment functions.

The storage medium for storing the program codes may be a flexible disk, a hard disk, a ROM, a RAM, a magnetic tape, a non-volatile memory card, a CD-ROM, a CD-R, a DVD, an optical disk, a magneto optical disk, an MO or the like.

The invention also covers the case wherein the functions of each embodiment are realized by writing the program codes into a memory of a function expansion card inserted into a computer or of a function expansion unit connected to the computer, and thereafter by making a CPU of the function expansion card or function expansion unit execute a portion or the whole of actual processes.

Many widely different embodiments of the present invention may be constructed without departing from the spirit and scope of the present invention. It should be understood that the present invention is not limited to the specific embodiments described in the specification, excepted as defined in the appended claims.

This application claims priority from Japanese Patent Application No. 2003-367472 filed Oct. 28, 2003, which is hereby incorporated by reference herein.

What is claimed is:

1. An image processing apparatus comprising:
    display control means for displaying a story board on a display device, the story board displaying a plurality of representative images corresponding to a plurality of image clips in a reproduction order and displaying an audio lane showing a plurality of audio clips in a reproduction order in parallel to the plurality of representative images, and said display control means displaying a border of the audio clip on the audio lane at one of a first predetermined position and a second predetermined position corresponding respectively to a left end and a right end of each of the plurality of representative images; and
    change means for changing a reproduction order of the plurality of image clips and audio clips by using the story board displayed on the display device,
    wherein if reproduction of a leading audio clip ends at an intermediate point of a reproduction period of an m-th (m>1) image clip, said display control means displays a front end of the leading audio clip at left end of the audio lane, and displays the border of a back end of the leading audio clip at the first predetermined position corresponding to the representative image of the m-th image clip.

2. An image processing apparatus comprising:
    display control means for displaying a story board on a display device, the story board displaying a plurality of representative images corresponding to a plurality of image clips in a reproduction order and displaying an audio lane showing a plurality of audio clips in a reproduction order in parallel to the plurality of representative images, and said display control means displaying a border of the audio clip on the audio lane at one of a first predetermined position and a second predetermined position corresponding respectively to a left end and a right end of each of the plurality of representative images; and
    change means for changing a reproduction order of the plurality of image clips and audio clips by using the story board displayed on the display device,
    wherein if a reproduction time of a leading audio clip is longer than a total reproduction time of all of the image clips, said display control means displays a front end of the leading audio clip at a left end of the audio lane, and displays the border of a back end of the leading audio clip at the first predetermined position corresponding to a virtual clip next to a last image clip.

3. An image processing apparatus comprising:
    display control means for displaying a story board on a display device, the story board displaying a plurality of representative images corresponding to a plurality of image clips in a reproduction order and displaying an audio lane showing a plurality of audio clips in a reproduction order in parallel to the plurality of representative images, and said display control means displaying a border of the audio clip on the audio lane at one of a first predetermined position and a second predetermined position corresponding respectively to a left end and a right end of each of the plurality of representative images; and
    change means for changing a reproduction order of the plurality of image clips and audio clips by using the story board displayed on the display device,
    wherein if reproduction of an (n−1)-th (n>1) audio clip ends during a reproduction period of an m-th (m>1) image clip and reproduction of an n-th audio clip ends during the reproduction period of the m-th image clip, display control means displays the border of a front end of the n-th audio clip at the first predetermined position corresponding to the representative image of the m-th image clip, and displays the border of a back end of the n-th audio clip at the second predetermined position corresponding to the representative image of the m-th image clip.

4. An image processing apparatus comprising:
    display control means for displaying a story board on a display device, the story board displaying a plurality of representative images corresponding to a plurality of image clips in a reproduction order and displaying an audio lane showing a plurality of audio clips in a reproduction order in parallel to the plurality of representative images, and said display control means displaying a border of the audio clip on the audio lane at one of a first predetermined position and a second predetermined position corresponding respectively to a left end and a right end of each of the plurality of representative images; and
    change means for changing a reproduction order of the plurality of image clips and audio clips by using the story board displayed on the display device, wherein if reproduction of an (n−1)-th (n>1) audio clip ends during a reproduction period of an m-th (m>1) image clip and reproduction of an n-th audio clip ends during a reproduction period of an (m+l)-th (l>0) image clip, said display control means displays the border of a front end of the n-th image clip at the first predetermined position corresponding to the representative image of the m-th image clip, and displays the border of a back end of the n-th audio clip at said the second predetermined position corresponding to the representative image of the (m+l)-th image clip.

5. An image processing apparatus comprising:

display control means for displaying a story board on a display device, the story board displaying a plurality of representative images corresponding to a plurality of image clips in a reproduction order and displaying an audio lane showing a plurality of audio clips in a reproduction order in parallel to the plurality of representative images, and said display control means displaying a border of the audio clip on the audio lane at one of a first predetermined position and a second predetermined position corresponding respectively to a left end and a right end of each of the plurality of representative images; and change means for changing a reproduction order of the plurality of image clips and audio clips by using the story board displayed on the display device, wherein if reproduction of an (n−1)-th (n>1) audio clip ends during a reproduction period of an m-th (m>1) image clip and a reproduction time of an n-th audio clip is longer than a sum of a remaining reproduction time of the m-th image clip and a reproduction time of all image clips following after the m-th image clip, said display control means displays the border of a front end of the n-th audio clip at the first predetermined position corresponding to the representative image of the m-th image clip, and displays the border of a back end of the n-th audio clip at the first predetermined position corresponding to the representative image of a virtual clip next to a last image clip.

6. An image processing apparatus comprising:

display control means for displaying a story board on a display device, the story board displaying a plurality of representative images corresponding to a plurality of image clips in a reproduction order and displaying an audio lane showing a plurality of audio clips in a reproduction order in parallel to the plurality of representative images, and said display control means displaying a border of the audio clip on the audio lane at one of a first predetermined position and a second predetermined position corresponding respectively to a left end and a right end of each of the plurality of representative images; and change means for changing a reproduction order of the plurality of image clips and audio clips by using the story board displayed on the display device, wherein if the border of a back end of an (n−1)-th (n>1) audio clip is displayed at the second predetermined position corresponding to the representative image of an m-th (m>0) image clip and reproduction of an n-th audio clip ends during a reproduction period of an (m+l)-th (l>0) image clip, said display control means displays the border of a front end of the n-th audio clip at the second predetermined position corresponding to the representative image of the m-th image clip, and displays the border of a back end of the n-th audio clip at the first predetermined position corresponding to the representative image of the (m+l)-th image clip.

7. An image processing apparatus comprising:

display control means for displaying a story board on a display device, the story board displaying a plurality of representative images corresponding to a plurality of image clips in a reproduction order and displaying an audio lane showing a plurality of audio clips in a reproduction order in parallel to the plurality of representative images, and said display control means displaying a border of the audio clip on the audio lane at one of a first predetermined position and a second predetermined position corresponding respectively to a left end and a right end of each of the plurality of representative images; and change means for changing a reproduction order of the plurality of image clips and audio clips by using the story board displayed on the display device, wherein if reproduction of an (n−1)-th (n>1) audio clip starts and ends during a reproduction period of an m-th (m>0) image clip and a reproduction time of an n-th audio clip is longer than a sum of a remaining reproduction time of the m-th image clip and a reproduction time of all image clips following after the m-th image clip, said display control means displays the border of a front end of the n-th audio clip at the second predetermined position corresponding to the representative image of the m-th image clip, and displays the border of a back end of the n-th audio clip at the first predetermined position corresponding to the representative image of a virtual clip next to a last image clip.

8. An image processing apparatus comprising:

display control means for displaying a story board on a display device, the story board displaying a plurality of representative images corresponding to a plurality of image clips in a reproduction order and displaying an audio lane showing a plurality of audio clips in a reproduction order in parallel to the plurality of representative images, and said display control means displaying a border of the audio clip on the audio lane at one of a first predetermined position and a second predetermined position corresponding respectively to a left end and a right end of each of the plurality of representative images; and change means for changing a reproduction order of the plurality of image clips and audio clips by using the story board displayed on the display device, wherein if reproduction of an (n−1)-th (n>1) audio clip ends during a reproduction period of a last image clip and a reproduction time of an n-th audio clip is longer than a remaining reproduction time of the last image clip, said display control means displays the border of a back end of the n-th audio clip at first predetermined position corresponding to the representative image of a virtual clip next to the last image clip, displays the border of a front end of an (n+1)-th audio clip at the first predetermined position corresponding to a virtual clip next to the last image clip, and displays the border of a back end of the (n+1)-th audio clip at the second predetermined position corresponding to the representative image of the virtual clip.

* * * * *